US009262398B2

(12) United States Patent  (10) Patent No.: US 9,262,398 B2
Swerdlow et al.  (45) Date of Patent: Feb. 16, 2016

(54) LANGUAGE SET DISAMBIGUATOR

(75) Inventors: Andrew Swerdlow, San Francisco, CA (US); Clément Roux, L'Hay-le-Roses (FR); Cibu Johny, Santa Clara, CA (US); Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 977 days.

(21) Appl. No.: 13/278,605

(22) Filed: Oct. 21, 2011

(65) Prior Publication Data

US 2015/0161097 A1  Jun. 11, 2015

Related U.S. Application Data

(60) Provisional application No. 61/491,799, filed on May 31, 2011.

(51) Int. Cl.
*G06F 17/27* (2006.01)
*G06F 9/44* (2006.01)
*G06F 3/0482* (2013.01)
*G06F 17/28* (2006.01)

(52) U.S. Cl.
CPC ............ *G06F 17/275* (2013.01); *G06F 3/0482* (2013.01); *G06F 9/4448* (2013.01); *G06F 17/289* (2013.01)

(58) Field of Classification Search
CPC .... G06F 17/289; G06F 3/0482; G06F 9/4448
USPC .......................................................... 704/8
See application file for complete search history.

(56) References Cited

U.S. PATENT DOCUMENTS

| | | | |
|---|---|---|---|
| 5,917,484 A * | 6/1999 | Mullaney | 715/703 |
| 6,252,589 B1 | 6/2001 | Rettig | |
| 6,339,755 B1 * | 1/2002 | Hetherington et al. | 704/8 |
| 7,681,127 B2 | 3/2010 | Thurston | |
| 8,010,339 B2 | 8/2011 | Arora | |
| 2002/0083453 A1* | 6/2002 | Menez | 725/47 |
| 2002/0133523 A1* | 9/2002 | Ambler et al. | 707/536 |
| 2002/0143523 A1 | 10/2002 | Balaji et al. | |
| 2002/0177993 A1* | 11/2002 | Veditz et al. | 704/8 |
| 2004/0015343 A1* | 1/2004 | Nakayama | 704/8 |
| 2004/0125152 A1* | 7/2004 | Sommers et al. | 345/856 |
| 2006/0074629 A1* | 4/2006 | Chiu et al. | 704/8 |
| 2006/0210026 A1* | 9/2006 | Duplessis et al. | 379/88.05 |
| 2006/0242202 A1* | 10/2006 | Li | 707/104.1 |
| 2007/0017971 A1* | 1/2007 | Im | 235/379 |
| 2007/0073530 A1* | 3/2007 | Iso-Sipila et al. | 704/3 |
| 2007/0124675 A1* | 5/2007 | Ban et al. | 715/703 |
| 2008/0040667 A1* | 2/2008 | Awada et al. | 715/703 |
| 2008/0114588 A1* | 5/2008 | Scott et al. | 704/8 |

OTHER PUBLICATIONS

Language code, [online] from Wikipedia, retrieved from www.archive.org, Archived on Oct. 9, 2010.*

* cited by examiner

*Primary Examiner* — Jialong He
(74) *Attorney, Agent, or Firm* — Remarck Law Group PLC

(57) ABSTRACT

A set of language tags in a backend application can be passed to a frontend application in the form of a language selection tool. The disclosure creates a mapping between the frontend and backend application of at least one non-default language descriptor string onto a language tag of the backend application. The frontend language selection tool then displays to the user the non-default language descriptor string. The use of non-default language descriptor strings clarifies to the user otherwise ambiguous language identifiers.

20 Claims, 4 Drawing Sheets

LANGUAGE SET DISAMBIGUATOR

CROSS-REFERENCE TO RELATED APPLICATIONS

This application claims priority to U.S. Provisional Application No. 61/491,799, filed May 31, 2011, the disclosure of which is incorporated herein in its entirety for all purposes.

BACKGROUND

A data structure to represent a language usually contains a plurality of language identifiers or language tags. Language tags have a language code and may also include a region code, script information, or both a region code and script information. The language code indicates a language, such as English. A region code indicates the dialect or locale of the language, such as Great Britain. "Latin" is an example of script information; script information indicates the written form of the identified language. A user interface may provide to a user a list of supported languages for an application with a language picker that allows the user to specify which supported language is preferred by the user. The language picker typically presents the available languages without regard to whether the region code is required or present. For example, the English language contains several dialects, perhaps the best known being British and American, which differ in speech, orthography, and grammar. For example, if the language tags include "en-US" and "en-GB", a language picker typically will present these as "English (US)" and "English (GB)" respectively, based exclusively on the language identifier, without considering other information about languages being provided in a language selection tool. In another example, if the language tags include "en" and "en-GB", a language picker will display "English" and "English (GB)" respectively. Thus, a conventional language picker typically only displays a description of the language tags that it receives, and does not supplement information to clarify what language choice is available to a user.

Language tags are abbreviated language codes and, typically, the Internet Engineering Task Force ("IETF") language tags are employed in applications. For example, "en" is an IETF language tag that refers to the English language. BCP-47 is the IETF's current standard for language tags and the current specification for BCP-47 is RFC-5646, which describes the language tag syntax. Language tags are used in a variety of internet protocols, such as HTTP, and programming languages such as HTML. In practice, programmers generally avoid adding region codes or scripts to language tags where they do not add distinguishing information. Thus, the IETF language tags are a de facto language standard for many programs.

BRIEF SUMMARY

In one embodiment of the disclosed subject matter, a plurality of language identifiers may be received from a backend application. At least one of the received plurality of language identifiers may be mapped to a non-default language descriptor string based upon languages supported by a frontend application. At least one of the received plurality of language identifiers may be mapped to a default language descriptor string based upon the languages supported by a frontend application. The plurality of language descriptor strings may be presented to a user. A selection of one of the plurality of language descriptors may be received from the user. A message indicating the language selected by the user may be sent to the backend application.

According to another embodiment of the disclosed subject matter, a plurality of language identifiers may be received from a backend application. Each of the received plurality of language identifiers may be mapped to a descriptor string based upon the languages supported by a frontend application, at least one of the plurality of language identifiers being mapped to a non-default language descriptor string. The plurality of language descriptor strings may then be presented to a user.

Embodiments of the disclosed subject matter include a system that may have a database storing a plurality of language identifiers and a processor in connection with said database. The processor may be configured to receive from an application the plurality of language identifiers and map each of the received plurality of language identifiers to a language descriptor string based upon the languages supported by a frontend application, at least one of the received plurality of language identifiers being mapped to a non-default language descriptor string. The plurality of language descriptor strings may be presented to a user.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Generally, a backend application contains language identifiers, which are conveyed to a language picker in a frontend application. The language picker displays language descriptor strings, which are a translation of the backend language tags, based upon the languages available in the application. The application may then be resolved in a language selected by a user.

An application capable of displaying both British and American English, but failing to clearly inform the user about the dialect may cause a user to make a suboptimal language selection. For example, a language picker might present a user from India with both "English" and "English (GB)" as language options. Failing to realize that "English" refers to the American dialect or that "GB" refers to the British dialect, the user might select "English" as the language with which the application displays content when "English (GB)" may have been preferred by the user. Thus, a language picker that conveys to the user a more accurate representation of what languages in an application are available would mitigate the likelihood of a user making a suboptimal language selection.

Figure 1:
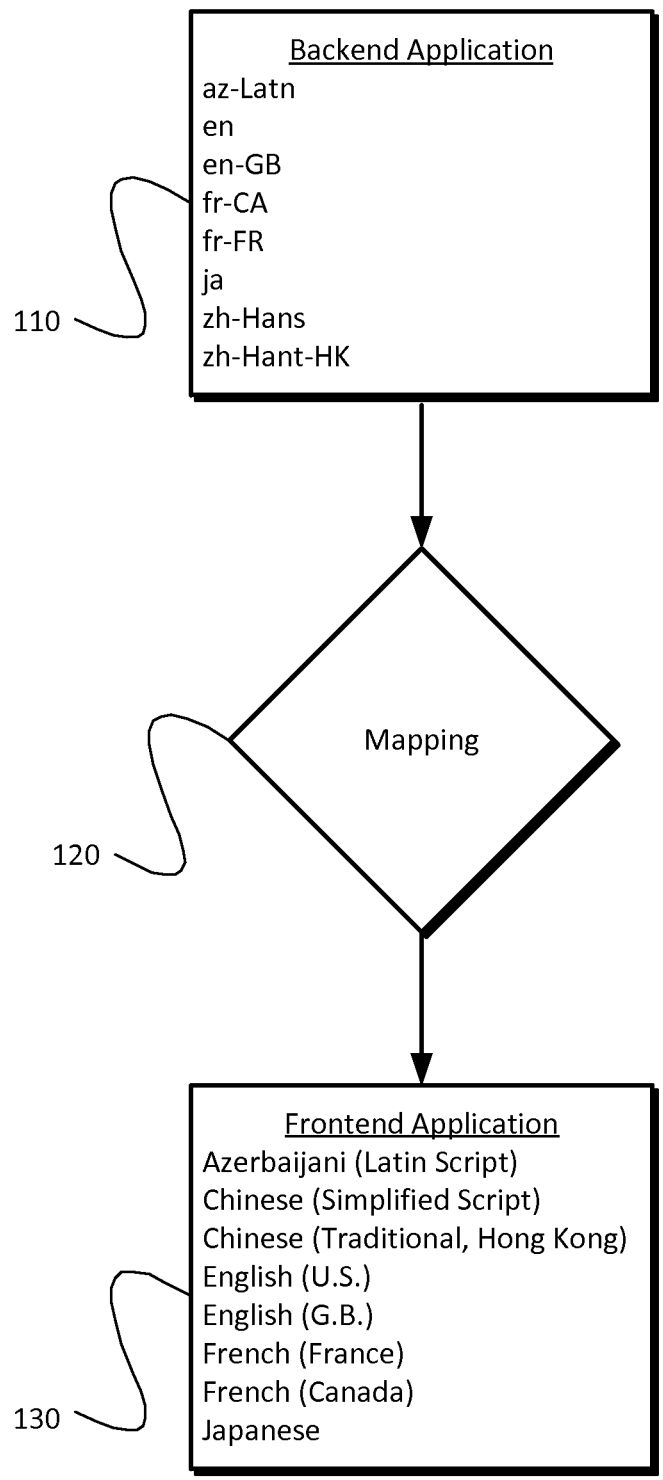
FIG. 1 shows an example arrangement and information flow for language tag mapping according to an embodiment of the disclosed subject matter.

Embodiments of the disclosed subject matter may use a mapping 120 between a frontend application 130 language picker or language selection tool and the backend application 110 as shown in FIG. 1. A frontend application 130 can refer to a part of an application with which a user interfaces directly. A backend application 110 can refer to those aspects of a program, whether local or remote, with which a user does not directly interface. A backend application 110 may use a network to communicate with a frontend application 130. For example, a server may have a backend application 110 that communicates with a frontend application 130 running on a user's computing device. A network may be a local network, wide-area network, the Internet, or any other suitable communication network, and may be implemented on any suitable platform including wired, wireless or both wired and wireless networks. The backend application 110 may be executed locally, for example, on a user's computing device and be a part of the same program as the frontend application 130.

FIG. 1 displays an example of language identifiers in a backend application 110. The language tags can indicate a number of features about a language. For example, "fr" represents the French language. In FIG. 1 two variations of the French language are shown. The "CA" and "FR" region codes indicate the French dialect spoken in Canada and France respectively. As another example, the Chinese language is represented by "zh" and can be written with either a simplified or traditional script, represented by "Hans" and "Hant" respectively. "Hant-HK" refers to the traditional form of Chinese as used in Hong Kong. The language tags shown in the backend application 110 are illustrative, and any abbreviation used for any of a plurality of languages, including those that do not conform with BCP-47, may be utilized in embodiments of the presently disclosed subject matter.

In a conventional system that provides a language selection tool, the language identifier can be passed to a language picker, which presents a language to the user. The language selection tool may not take into account the other languages being presented, and/or the absence or presence of other distinguishing language features including dialect, indicated by a region code, or script. For example, if provided with both "en" and "en-GB", a conventional language selection tool may present the user with the languages "English" and "English (GB)." As previously indicated, this may cause the user to select a less-desirable language.

In contrast, according to embodiments of the presently described subject matter, the language identifiers defined in the backend application 110 may be mapped onto non-default language descriptor string names before the language tags are provided to the frontend application 130. In some cases, the non-default language descriptor string names that are shown in the frontend application 130 may fully resolve a language. For example, a backend application 110 may contain the language identifiers "en" and "en-GB", which correspond to British and American English, respectively. The frontend application 130 may display "English (U.S.)" and "English (G.B.)" to the user, even though the backend language identifier "en-US" was not provided to the frontend application. In this case, the region code "U.S." is mapped to the corresponding "en" language tag to clearly indicate to a user that the dialect is American. The user may then make an informed selection of a language with which the user would like the application to display content.

Figure 2:
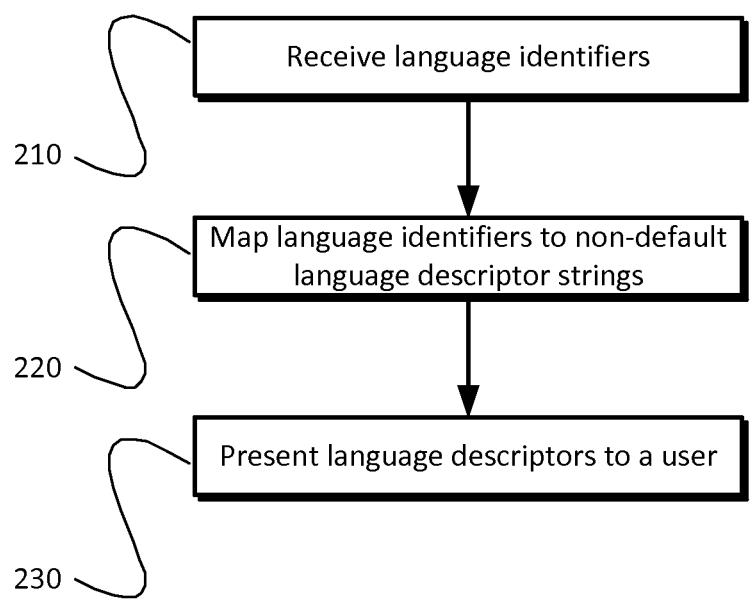
FIG. 2 shows an example process for a language tag disambiguator according to an embodiment of the disclosed subject matter.

More generally, according to embodiments of the disclosed subject matter, non-default language descriptor strings may be mapped, at 120, onto language identifiers using a technique such as illustrated in FIG. 2 to provide a user with more information about a language selection in an application. At 210, a plurality of language identifiers may be received from a backend application. Language identifiers can refer to language codes, region codes, script information or any combination thereof. Language identifiers also include language tags. Examples of language identifiers are shown in the backend application 110 in FIG. 1. A default language descriptor string refers to the description provided based exclusively on the language identifier, without considering other information about languages being provided in a language selection tool. For example, BCP-47 prescribes mapping the default descriptor strings "English" and "English (GB)" to "en" and "en-GB" respectively. A non-default language descriptor string can refer to a language descriptor that includes supplemental information provided to a frontend application 130. For example, information that is not ordinarily provided under BCP-47 can be a non-default language descriptor string. As another example, a non-default language descriptor string may be the language identifier for a language and region code combination (such as "fr-CA"), but mapped to a non-default language descriptor string that may only refer to the language code (such as "French"). Thus, a default descriptor string may refer to "fr-CA" as "French (Canadian)" whereas a non-default descriptor string may refer to it as "French".

At 220 at least one of the language identifiers or language tags may be mapped to a non-default language descriptor string based upon the languages supported in by a frontend application 130. For example, "en" is conventionally defined as "English" by BCP-47. The disclosure includes additional information that, for example, clarifies "en" by mapping it to "English (U.S.)" in the frontend application 130. By way of example, other non-default language descriptor strings may be used as alternatives to "U.S." such as US, U.S.A., America, or United States. A language identifier also may be mapped to a default language. For example, "en" can be mapped to "English" to indicate the default language. Although a language descriptor string, whether default or non-default, is usually represented by text, a language descriptor string may also be represented by a graphic such as a flag.

Figure 3:
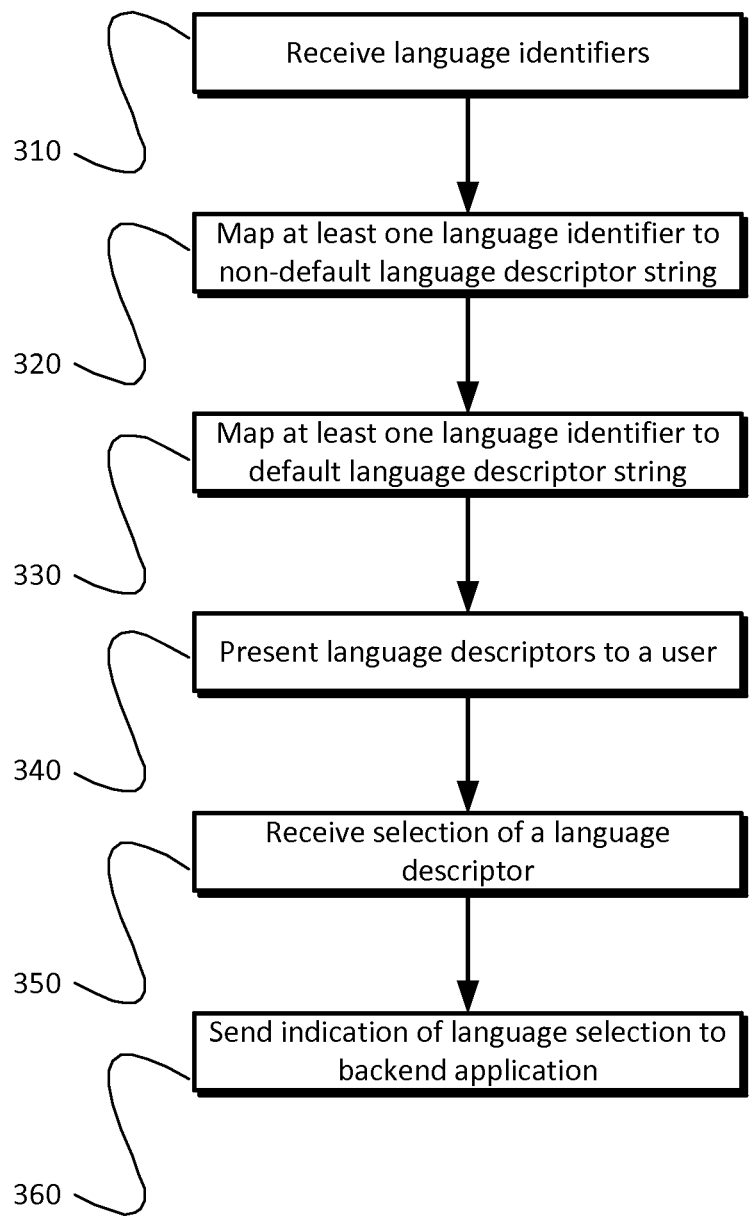
FIG. 3 shows a more specific example process for a language tag disambiguator according to an embodiment of the disclosed subject matter.

Upon mapping at least one of the language identifiers to a non-default language descriptor string 220, the non-default language descriptor may be presented to a user 230. The presentation to the user may be in the form of a language selection tool such as a language picker. Language descriptor strings may be presented to a user in any suitable manner, for example, in a table, graphically, or hierarchical menu. The user may then make an informed language selection. That selection may be received by the frontend application 130. The user's language selection may then be sent or utilized by an application such as the backend application 110 or another program that may be separate from the one in which the language selection was made. FIG. 3 shows a more specific example process for a language tag disambiguator according to an embodiment of the disclosed subject matter. At 310 a plurality of language identifiers may be received from a backend application 110. At 320 at least one of the received plurality of language identifiers may be mapped to a non-default language descriptor string based upon languages supported by a frontend application 130. At least one of the received plurality of language identifiers may be mapped 330 to a default language descriptor string based upon the languages supported by a frontend application. The frontend application 130 may present to a user the plurality of language descriptor strings 340. The frontend application 130 may receive the user's language selection of one of the plurality of language descriptors 350. At 360 the user's selection may be communicated to a backend application 110 using any of the communication methods described herein.

Figure 4:
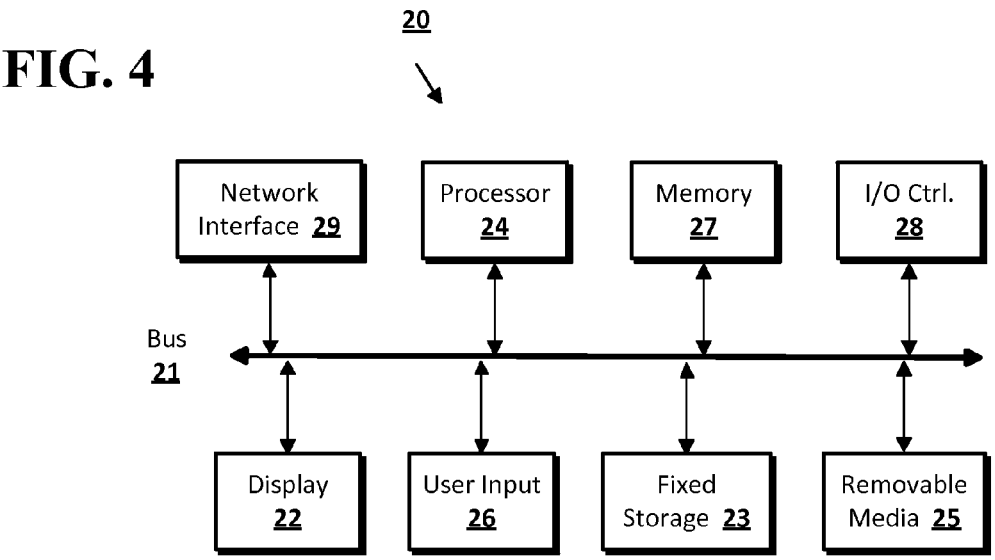
FIG. 4 shows a computer according to an embodiment of the disclosed subject matter.

Embodiments of the presently disclosed subject matter may be implemented in and used with a variety of component and network architectures. FIG. 4 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
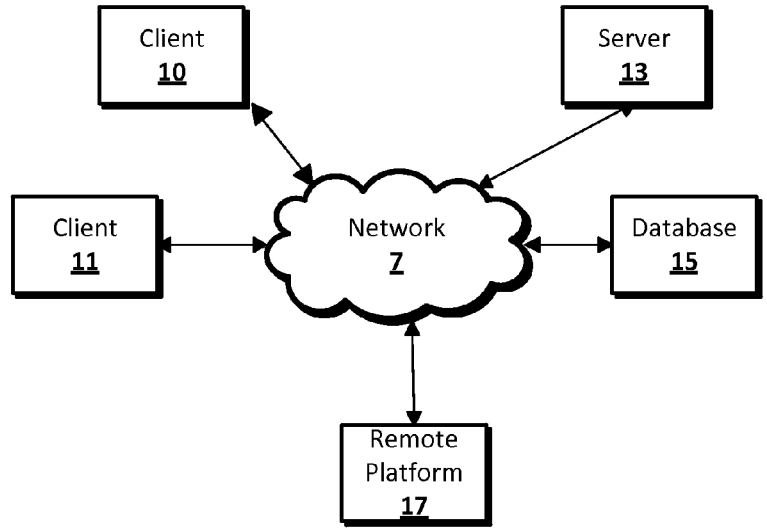
FIG. 5 shows a network configuration according to an embodiment of the disclosed subject matter.

FIG. 5 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of a computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:

receiving, at a language selection tool and from a first application of a plurality of applications, a plurality of first language identifiers, each of the first plurality of language identifiers corresponding to a default language descriptor string and to one of a plurality of languages supported by the first application;

mapping, at the language selection tool and based upon the plurality of languages supported by the first application, each of the received plurality of first language identifiers to either: (i) its corresponding default language descriptor string, or (ii) a non-default language descriptor string, to obtain a list of first language descriptor strings associated with the plurality of languages supported by the first application, each non-default language descriptor string being different than the default language descriptor strings;

presenting to a user the list of first language descriptor strings associated with the plurality of languages supported by the first application;

receiving from the user a selection of one of the list of first language descriptor strings;

sending to the first application a message indicating the language selected by the user;

receiving, at the language selection tool and from a second application of the plurality of applications, a plurality of second language identifiers, each of the plurality of second language identifiers corresponding to a default language descriptor string and to one of a plurality of languages supported by the second application;

mapping, at the language selection tool, each of the received plurality of second language identifiers to either (i) its corresponding default language descriptor string, or (ii) a non-default language descriptor string based upon the plurality of languages supported by the second application to obtain a list of second language descriptor strings associated with the plurality of languages supported by the second application, the non-default language descriptor string being different than the default language descriptor strings;

presenting to the user the list of second language descriptor strings associated with the plurality of languages supported by the second application;

receiving from the user a selection of one of the list of second language descriptor strings; and sending to the second application a message indicating the language selected by the user.

2. The method of claim 1, further comprising:

sending the message indicating the language selected by the user to a third application different from the first and second applications.

3. A method, comprising:

receiving, at a language selection tool and from a first application of a plurality of applications, a plurality of first language identifiers, each of the first plurality of language identifiers corresponding to a default language descriptor string and to one of a plurality of languages supported by the first application;

obtaining a list of first language descriptor strings associated with the plurality of languages supported by the first application by mapping, based upon the plurality of languages supported by the first application, each of the received plurality of first language identifiers to either: (i) its corresponding default language descriptor string, or (ii) a non-default language descriptor string;

presenting to a user the list of first language descriptor strings associated with the plurality of languages supported by the first application;

receiving, at the language selection tool and from a second application of the plurality of applications, a plurality of second language identifiers, each of the plurality of second language identifiers corresponding to a default language descriptor string and to one of a plurality of languages supported by the second application;

obtaining a list of second language descriptor strings associated with the plurality of languages supported by the second application by mapping, based upon the plurality of languages supported by the second application, each of the received plurality of second language identifiers to either: (i) its corresponding default language descriptor string, or (ii) a non-default language descriptor string; and presenting to the user the list of second language descriptor strings associated with the plurality of languages supported by the second application.

4. The method of claim 3, further comprising:

receiving from the user a selection of one of the plurality of first language descriptor strings; and sending a message indicating the language selected by the user to the first application.

5. The method of claim 4, further comprising sending the message indicating the language selected by the user to a third application different from the first and second applications.

6. The method of claim 4, wherein the message indicating the language selected by the user includes at least one RFC 5646-compliant tag.

7. The method of claim 3, wherein the first and second applications comprise backend applications that are in communication with a frontend application, the frontend application comprising the language selection tool.

8. The method of claim 3, wherein each non-default language descriptor string is different from its corresponding default language descriptor string.

9. The method of claim 3, wherein the list of first language descriptor strings includes a graphic element for each of the first language descriptor strings.

10. The method of claim 3, wherein the list of first language descriptor strings includes text for each of the first language descriptor strings.

11. The method of claim 3, wherein the first and second language identifiers include RFC 5646-compliant tags.

12. A computer system, comprising:

a database storing a plurality of language identifiers;

at least one processor in connection with said database, said at least one processor executing a language selection tool and being configured to:

receive, at the language selection tool and from a first application of a plurality of applications, a plurality of first language identifiers, each of the first plurality of language identifiers corresponding to a default language descriptor string and to one of a plurality of languages supported by the first application;

obtaining a list of first language descriptor strings associated with the plurality of languages supported by the first application by mapping, based upon the plurality of languages supported by the first application, each of the received plurality of first language identifiers to either:

(i) its corresponding default language descriptor string, or (ii) a non-default language descriptor string;

presenting to a user the list of first language descriptor strings associated with the plurality of languages supported by the first application;

receiving, at the language selection tool and from a second application of the plurality of applications, a plurality of second language identifiers, each of the plurality of second language identifiers corresponding to a default language descriptor string and to one of a plurality of languages supported by the second application;

obtaining a list of second language descriptor strings associated with the plurality of languages supported by the second application by mapping, based upon the plurality of languages supported by the second application, each of the received plurality of second language identifiers to either: (i) its corresponding default language descriptor string, or (ii) a non-default language descriptor string; and presenting to the user the list of second language descriptor strings associated with the plurality of languages supported by the second application.

13. The computer system of claim 12, wherein the at least one processor is further configured to:

receive from the user a selection of one of the plurality of first language descriptor strings; and send a message indicating the language selected by the user to the first application.

14. The computer system of claim 13, wherein the at least one processor is further configured to send the message indicating the language selected by the user to a third application different from the first and second applications.

15. The computer system of claim 13, wherein the message indicating the language selected by the user includes at least one RFC 5646-compliant tag.

16. The computer system of claim 12, wherein the first and second applications comprise backend applications that are in communication with a frontend application, the frontend application comprising the language selection tool.

17. The computer system of claim 12, wherein each non-default language descriptor string is different from its corresponding default language descriptor string.

18. The computer system of claim 12, wherein the list of first language descriptor strings includes a graphic element for each of the first language descriptor strings.

19. The computer system of claim 12, wherein the list of first language descriptor strings includes text for each of the first language descriptor strings.

20. The computer system of claim 12, wherein the first and second language identifiers include RFC 5646-compliant tags.

* * * * *